United States Patent
Mannar

(10) Patent No.: US 12,299,499 B2
(45) Date of Patent: *May 13, 2025

(54) SYSTEMS AND METHODS TO LEVERAGE UNUSED COMPUTE RESOURCE FOR MACHINE LEARNING TASKS

(71) Applicant: STATE FARM MUTUAL AUTOMOBILE INSURANCE COMPANY, Bloomington, IL (US)

(72) Inventor: Sateesh Mannar, Plano, TX (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 19 days.

This patent is subject to a terminal disclaimer.

(21) Appl. No.: 18/052,684

(22) Filed: Nov. 4, 2022

(65) Prior Publication Data

US 2023/0090320 A1 Mar. 23, 2023

Related U.S. Application Data

(63) Continuation of application No. 17/000,553, filed on Aug. 24, 2020, now Pat. No. 11,526,385.

(60) Provisional application No. 63/004,202, filed on Apr. 2, 2020.

(51) Int. Cl.
*G06F 9/50* (2006.01)
*G06F 9/48* (2006.01)
*G06F 9/54* (2006.01)

(52) U.S. Cl.
CPC .......... *G06F 9/5083* (2013.01); *G06F 9/4881* (2013.01); *G06F 9/542* (2013.01)

(58) Field of Classification Search
CPC .................................................... G06F 9/5083
See application file for complete search history.

(56) References Cited

U.S. PATENT DOCUMENTS

| | | | |
|---|---|---|---|
| 8,095,791 B2 * | 1/2012 | Suwabe | H04N 1/32545 709/201 |
| 11,150,943 B2 | 10/2021 | Rhee et al. | |
| 11,755,363 B2 * | 9/2023 | Moroski | G06F 9/4856 718/102 |

(Continued)

FOREIGN PATENT DOCUMENTS

EP 3872736 A1 * 9/2021

*Primary Examiner* — Charlie Sun
(74) *Attorney, Agent, or Firm* — MARSHALL, GERSTEIN & BORUN LLP

(57) ABSTRACT

Systems and methods relating to leveraging inactive computing resources are discussed. An example system may include one or more computing nodes having an active state and an inactive state, one or more processors, and a memory. The memory may contain instructions therein that, when executed, cause the one or more processors to identify a task to be performed by the one or more computing nodes based upon a received request. The instructions may further cause the one or more processors to create one or more sub-tasks based upon the task and schedule the one or more sub-tasks for execution on the one or more computing nodes during the inactive state. The instructions may further cause the one or more processors to collate the one or more sub-tasks into a completed task, and generate a completed task notification based upon the completed task.

20 Claims, 6 Drawing Sheets

(56) References Cited

U.S. PATENT DOCUMENTS

| 2011/0099403 | A1* | 4/2011 | Miyata | G06F 9/5088 |
| | | | | 718/1 |
| 2015/0178126 | A1* | 6/2015 | Modani | G06F 9/4881 |
| | | | | 718/102 |
| 2021/0278728 | A1* | 9/2021 | Moriya | C09K 19/52 |

* cited by examiner

SYSTEMS AND METHODS TO LEVERAGE UNUSED COMPUTE RESOURCE FOR MACHINE LEARNING TASKS

CROSS-REFERENCE TO RELATED APPLICATIONS

This application is a continuation of U.S. patent application Ser. No. 17/000,553, entitled "Systems and Methods to Leverage Unused compute Resource for Machine Learning Tasks," filed on Aug. 24, 2020, which claims the benefit of U.S. Provisional Patent Application No. 63/004,202, entitled "Systems and Methods to Leverage Unused Compute Resource for Machine Learning Tasks" and filed Apr. 2, 2020, the disclosures of which are expressly incorporated by reference herein in its entirety.

TECHNICAL FIELD

The present disclosure generally relates to systems and methods for performing machine learning tasks, and more particularly to identifying unused computing resources and optimally scheduling the tasks for performance on the unused computing resources.

BACKGROUND

Demand and overall spending on computing resources increases by the day. More recent developments such as data generated with the Internet of things (IoT) and autonomous vehicles may further exacerbate this demand. One development in particular that challenges conventional computing systems is the performance of machine learning (ML) and artificial intelligence (AI) applications. These applications may be incredibly processor intensive to train, test, and monitor. Consequently, ML/AI applications may tax even the most robust network and processing architectures. Correspondingly, a major point of emphasis for any industry or business utilizing ML or AI is minimizing the impact such tasks may have on their computing infrastructure.

Unfortunately, conventional systems and techniques tasked with performing ML/AI applications may encounter a number of issues. For example, conventional systems and techniques may lack the processing power necessary to efficiently perform the ML/AI tasks. As a result, the conventional systems and techniques may typically require extended periods of task performance and occupation of computing resources as they attempt to sequentially perform the ML/AI tasks to which they are assigned. Thus, businesses or other entities relying on the conventional systems and techniques to perform their ML/AI applications may experience major delays and reductions in their productivity due to the inefficiencies of the conventional systems and techniques. Conventional systems and techniques may have other drawbacks as well.

SUMMARY

Generally, the present embodiments relate to performing machine learning tasks by identifying unused computing resources and optimally scheduling the tasks for performance on the unused computing resources. The systems and methods of the present disclosure may harness unused computing resources of an organization or sub-organization to execute self-contained ML tasks or any non-time constrained task (batch jobs) to mitigate some of the exponential computing costs associated with these tasks. Additional, fewer, or alternative features described herein below may be included in some aspects.

As mentioned, the demand on computing resources continues to increase by the day. Thankfully, the processing power of an average computing device also continues to increase. However, many computing devices are in use just eight to nine hours a day during a work week, or forty hours out of a one-hundred and sixty-eight hour week. These unused computing resources may be leveraged as free computing nodes when they are idle or unused. Thus, the systems and methods of the present disclosure may enable an internal cloud environment with unused computer resources to augment and offset existing infrastructure demands, to reduce the infrastructure costs, and reduce the reliance on external cloud platforms (e.g., Google cloud platform, AWS, Azure, etc.).

Accordingly, the systems and methods of the present disclosure provide numerous advantages over conventional systems and techniques. Generally, the systems and methods of the present disclosure may more efficiently execute ML/AI tasks and applications as these jobs may be readily broken into multiple self-contained sub-tasks that can be processed and reassembled as part of an overall pipeline. This increased efficiency may result in quicker turnaround times, reduced demand on internal computing infrastructures, and overall higher productivity and customer satisfaction levels. More specifically, the systems and methods of the present disclosure may provide several improvements over conventional systems and techniques, such as, and without limitation:

- Breaking down any ML pipeline job into multiple autonomous sub-tasks that may be readily performed by an individual node of an internal cloud environment.
- De-identifying/Anatomizing computing resources so that potentially identifying data associated with the computing resource is not provided to a user requesting the ML/AI task performance.
- De-identifying/Anatomizing the ML/AI task to be performed and the data associated with that task so that potentially identifying information associated with the user requesting the task performance is not provided to a node of the internal cloud environment.
- Re-assembling the completed, de-identified tasks before submitting the completed task to the user requesting the task performance.
- The ability to include unused computing resources at the various levels within an organization. For example, a business or corporation may implement the systems and methods of the present disclosure at a user, department, and/or organization level.
- Automatically deactivating the task performance on a particular node when the particular node is in use, and automatically reactivating the task performance once the particular node is again inactive.
- Periodically or upon receipt of a request, providing a mechanism for users to visualize the status of the submitted/requested tasks.
- Creating computing clusters or otherwise categorizing and prioritizing computing resources based upon shared resource characteristics.
- Providing a mechanism to meter the use of shared resources, creating an ecosystem where the unused computing resources in an internal cloud environment may be leveraged and monetized Automatically and seamlessly augmenting additional resource needs with available public cloud computing providers.

In one aspect, a system for leveraging inactive computing devices may be provided. The system may include one or more computing nodes having an active state and an inactive state, one or more processors, and a memory communicatively coupled to the one or more computing nodes and the one or more processors. The memory may contain instructions therein that, when executed, cause the one or more processors: (1) to identify a task to be performed by the one or more computing nodes based upon a received request; (2) create one or more sub-tasks based upon the task; (3) schedule the one or more sub-tasks for execution on the one or more computing nodes during the inactive state; (4) responsive to the execution of each of the one or more sub-tasks, collate the one or more sub-tasks into a completed task; and/or (5) generate a completed task notification based upon the completed task. The system and/or instructions may direct additional, less, or alternate functionality or actions, including those discussed elsewhere herein.

In another aspect, a computer-implemented method for leveraging inactive computing devices may be provided. The method may include, via one or more processors and/or associated transceivers, (1) identifying a task to be performed by one or more computing nodes based upon a received request, wherein each of the one or more computing nodes has an active state and an inactive state; (2) creating one or more sub-tasks based upon the task; (3) scheduling the one or more sub-tasks for execution on the one or more computing nodes during the inactive state; (4) responsive to the execution of each of the one or more sub-tasks, collating the one or more sub-tasks into a completed task; and/or (5) generating a completed task notification based upon the completed task. The method may include additional, less, or alternate actions, including those discussed elsewhere herein.

In yet another aspect, a computer readable storage medium comprising non-transitory computer readable instructions stored thereon for leveraging inactive computing resources may be provided. The instructions, when executed on one or more processors, may cause the one or more processors to (1) identify a task to be performed by one or more computing nodes based upon a received request, wherein each of the one or more computing nodes has an active state and an inactive state; (2) create one or more sub-tasks based upon the task; (3) schedule the one or more sub-tasks for execution on the one or more computing nodes during the inactive state; (4) responsive to the execution of each of the one or more sub-tasks, collate the one or more sub-tasks into a completed task; and/or (5) generate a completed task notification based upon the completed task. The instructions may direct additional, less, or alternate functionality, including that discussed elsewhere herein.

BRIEF DESCRIPTION OF DRAWINGS

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

The Figures described below depict various aspects of the applications, methods, and systems disclosed herein. It should be understood that each Figure depicts an embodiment of a particular aspect of the disclosed applications, systems and methods, and that each of the Figures is intended to accord with one or more possible embodiments thereof. Furthermore, wherever possible, the following description refers to the reference numerals included in the following Figures, in which features depicted in multiple Figures are designated with consistent reference numerals.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

Processing and otherwise performing ML/AI tasks and applications currently suffers from a lack of available computing resources with which businesses and other entities may optimize their efforts. In order to provide accurate, timely, and actionable execution of these tasks, the techniques disclosed herein generally describe performing machine learning tasks by identifying unused computing resources and optimally scheduling the tasks for performance on the unused computing resources. The task receiver may receive a ML/AI task from a user, de-identify the task and any data associated therewith, break the task down into sub-tasks, and transmit the sub-tasks to nodes within the internal cloud environment for processing. With the authorization of a node user and when the node is in an inactive state, the ML/AI tasks may be automatically pushed to the node to execute the specified task(s). Thus, tasks related to training, testing, and monitoring ML/AI applications may be performed in an efficient, streamlined manner, reassembled, and returned to the requesting user.

Exemplary System for Leveraging Inactive Computing Resources

Figure 1A:
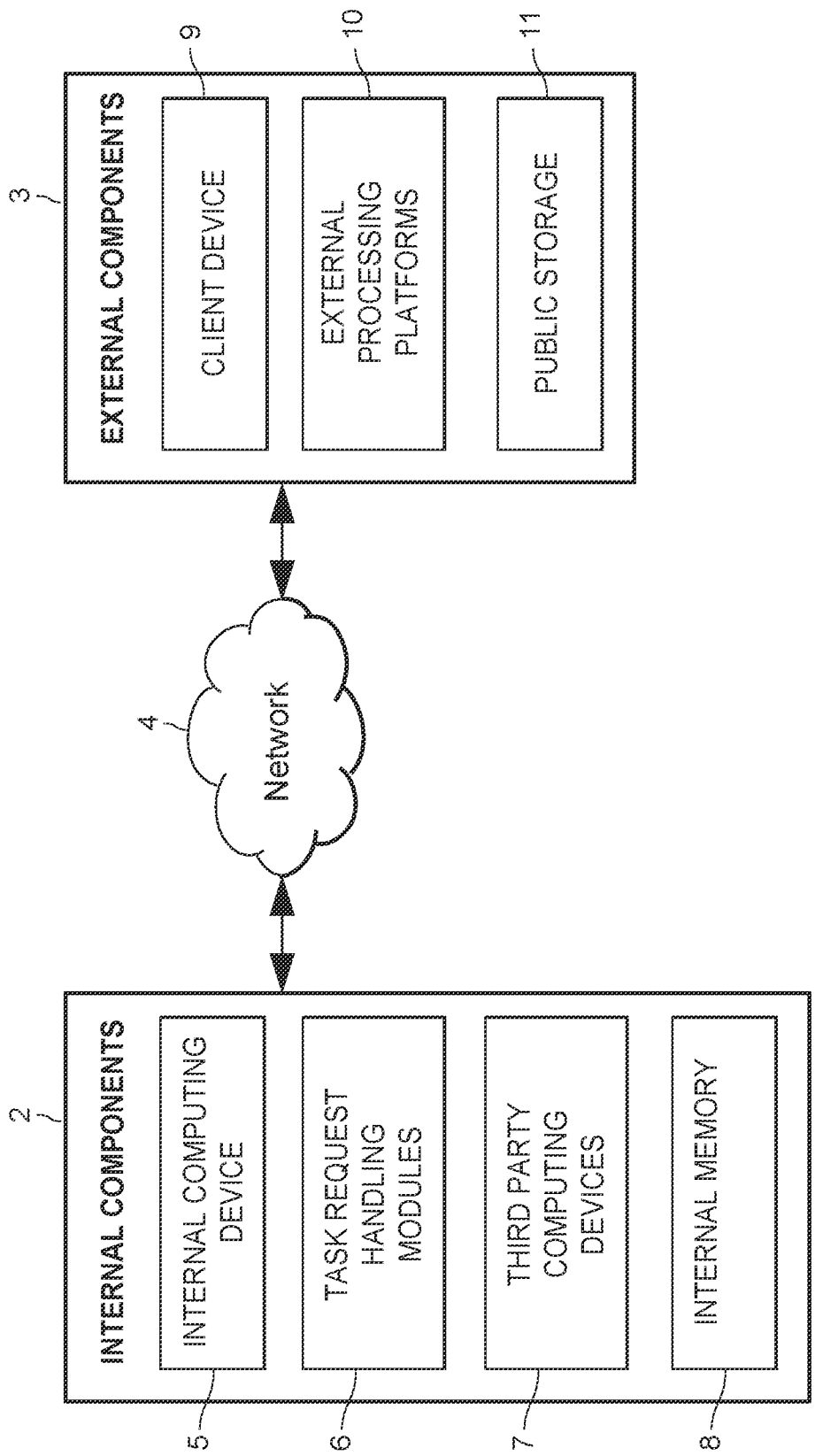
FIG. 1A is a block diagram of a high-level exemplary system for leveraging unused/inactive computing resources, in accordance with embodiments herein.

FIG. 1A is a block diagram of a high-level exemplary computing resource leveraging system 1 for leveraging unused/inactive computing resources on which the exemplary computer-based methods described herein may be implemented. The high-level architecture may include both hardware and software applications, as well as various data communications channels for communicating data between the various hardware and software components. The computing resource leveraging system 1 may be roughly divided into internal components 2 and external components 3. The internal components 2 may be associated with devices and modules configured to, inter alia, receive, process, and provide ML/AI task requests (also referenced herein as "jobs", "tasks", and "applications") to/from a user (also referenced herein as a "client") to facilitate, monitor, manage, direct, aggregate, and/or optimize performance of the ML/AI tasks. The external components 3 may be associated with processing platforms, clients, and/or other devices and may be configured to submit task requests, process task request overflow, and/or otherwise facilitate the performance of ML/AI tasks.

In some embodiments of the computing resource leveraging system 1, the internal components 2 may communicate with the external components 3 via a network 4. Various computing devices and modules may communicate with the external components 3 via the network 4 to allow the external components 3 to provide task requests, perform task request overflow processing, and/or receive the completed task requests. The external components 3 may use one or more servers to receive data from the internal components 2, store the received data, process the received data, and/or communicate information associated with the received or processed data. Some embodiments may include fewer, additional, or alternative components.

The internal components 2 may include various computing devices and modules configured to receive, organize, schedule, process, and/or collate information associated with the ML/AI task requests for clients initiating the task requests. Specifically, the internal components 2 may include one or more internal computing devices 5, task request handling modules 6, third party computing devices 7, and internal memory 8.

The one or more internal computing devices 5 may be one or more computing devices that are interconnected through an internal cloud-based network, and/or any other suitable secure private network/domain. Generally, the one or more internal computing device 5 may receive and execute the ML/AI task requests. More specifically, the one or more internal computing devices 5 may receive ML/AI tasks over the network 4, while the one or more internal computing devices 5 are in an inactive state. For example, a business or other entity may host a private network that is only accessible to computing devices issued to employees of the business or other entity for performance of processes related to the business or other entity (e.g., company-issued laptops, desktops, smartphones, tablets, smart watches, etc.). While an employee or other entity to which a computing device is issued is not actively using the computing device (e.g., the computing device is placed in sleep mode, has not been actively used past a threshold time, etc.), and the computing device is still connected to the network 4, the computing device may receive and perform (e.g., process) one or more ML/AI task requests.

In this manner, businesses with secure internal computing networks and ML/AI needs may leverage their processing infrastructure during otherwise unused processing time to perform critical processing functions. Moreover, businesses that wish to monetize their secure internal computing networks may sell or otherwise permit access to their processing infrastructure to perform processing functions for external customers/participants.

The task request handling modules 6 may be one or more computing devices and/or software routines that are interconnected through the internal cloud-based network, and may operate in conjunction with or on, for example, one or more of the one or more internal computing devices 5. Generally, the task request handling modules 6 may prepare ML/AI tasks for processing at the one or more internal computing devices 5 and for return to a client after task processing is completed. More specifically, the task request handling modules 6 may, inter alia, pre-process, de-identify, segment, schedule, and collate the ML/AI task requests.

For example, the task request handling modules 6 may interpret a ML/AI task request received from a client and determine a list of sub-tasks comprising the ML/AI task request. The task request handling modules 6 may then divide the ML/AI task request into the identified sub-tasks, remove identifying data from each sub-task, and schedule each sub-task for processing on one or more of the one or more internal computing devices 5. Once each of the sub-tasks are processed, the task request handling modules 6 may collate the sub-tasks and prepare a report for a client, which may include a breakdown of processing time and resources used, and a charge for use of those resources (e.g., a bill).

The third party computing devices 7 may be one or more computing devices that are interconnected through the internal cloud-based network, but may not have access to all secure elements, databases, files, etc. of the internal cloud-based network. Generally, the third party computing devices 7 may receive and execute the ML/AI task requests when in an inactive state, in a similar manner to the one or more internal computing devices 5. More specifically, the third party computing devices 7 may execute ML/AI task requests if the task request handling modules 6 determine that the one or more internal computing devices 5 are insufficient to handle the ML/AI task request.

For example, assume an entity hosts a private domain featuring one or more computing devices 5 and the task handling modules 6. The entity may outsource processing tasks to a trusted third party by allowing the third party to connect their third party computing devices 7 to the private domain in the event the one or more internal computing devices 5 included in the entity's private domain are active (e.g., in use by the user/owner), unable (e.g., lack of processing power/time), and/or otherwise unable to process a particular ML/AI task request.

The internal memory 8 may be one or more storage devices that are interconnected through the internal cloud-based network, and/or any other suitable secure private network/domain. Generally, the internal memory 8 may store information related to the ML/AI task requests and the one or more internal computing devices 5.

More specifically, the internal memory may store de-identified task data received from the task request handling modules 6, status updates related to task request processing from the one or more internal computing devices 5, computing hardware and associated specifications related to the one or more internal computing devices 5, and/or any other suitable data obtained or generated as a part of processing the ML/AI task requests. For example, the internal memory 8 may include random access memory (RAM) and program memories related to the task request handling modules 6 that may be implemented as semiconductor memories, magnetically readable memories, or optically readable memories.

Additionally, the internal memory 8 may store various models related to the data obtained or generated as a part of processing the ML/AI task requests. Generally, these models may include user-defined models, proprietary/custom models, insurance models, financial models, a model as an image, and/or combinations thereof. More specifically, the internal memory 8 may include, without limitation, a processing load distribution model, a scheduling model, a pricing model, and/or any other suitable model based upon data obtained or generated as a part of processing the ML/AI task requests. For example, the internal memory 8 may store a processing load distribution model configured to optimize the distribution of sub-tasks between/among the one or more internal computing devices 5.

Each of the various models stored in the internal memory 8 may utilize machine learning to continuously update and improve the various models. For example, each of the various models may include machine learning architectures, such as convolutional neural networks, logistic regression, decision trees, linear regression, k-nearest neighbors, etc.

The internal memory 8 may also include one or more databases configured to store part or all of the data related to the ML/AI task request processing described herein. Each database may be adapted to store data related to ML/AI task requests associated with a plurality of clients. Such data may include data related to task performance criteria, processing resources required/used, billable rates associated with processing resources, anticipated/extrapolated task performance timelines, etc. The one or more internal computing devices 5, the task request handling modules 6, and/or the third party computing devices 7 may utilize the one or more databases to store and/or access data stored in the databases when executing various functions and tasks associated with the methods discussed elsewhere herein.

The various computing devices of the internal components 2 may communicate with the external components 3 via wired or wireless connections to the network 4. The network 4 may be a proprietary network, a secure public internet, a virtual private network or some other type of network, such as dedicated access lines, plain ordinary telephone lines, satellite links, cellular data networks, and/or combinations of these. The network 4 may include one or more radio frequency communication links, such as wireless communication links with mobile computing devices, such as smartphones included in the internal computing devices 5, third party computing devices 7, and/or client devices 9. The network 4 may also include other wired or wireless communication links with other mobile computing devices or other computing devices. Where the network 4 may include the Internet, and data communications may take place over the network 4 via an Internet communication protocol.

The external components 3 may include various computing devices and modules configured to generate, process, and/or store information associated with the ML/AI task requests. Specifically, the external components 3 may include one or more client devices 9, external processing platforms 10, and public storage 11.

The client devices 9 may be one or more computing devices owned or otherwise possessed by a client submitting a ML/AI task request that are connected to the internal components 2 through the network 4. Generally, a client may use the client devices 9 to generate and submit ML/AI task requests to the internal components 2 for processing. More specifically, the client devices 9 may be any suitable computing device (e.g., laptops, desktops, smartphones, tablets, smart watches, etc.) that a client may use to develop a ML/AI task to be processed. For example, a client may develop a ML/AI task they wish to have executed (e.g., processed) using their personal desktop computer. The ML/AI task may require far more processing power than their personal desktop computer is capable of providing, so the client may submit the ML/AI task to the internal components 2 via the network 4 for processing.

The external processing platforms 10 may be one or more public processing platforms (e.g., Google cloud platform, AWS, Azure, etc.) that the internal components 2 may utilize to supplement ML/AI task request processing. Generally, the external processing platforms 10 may receive ML/AI sub-tasks from the internal components 2 across the network 4, perform the sub-tasks, and return the completed sub-tasks to the internal components 2.

More specifically, the external processing platforms 10 may receive ML/AI sub-tasks from the task request handling modules 6 that the modules 6 were unable to provide to one of the one or more internal computing devices 5 and/or third party computing devices 7. For example, all or a portion of the internal computing devices 5 and/or third party computing devices 7 may be in an active state wherein the users/owners of the computing devices 5, 7 are currently using or otherwise accessing the computing devices 5, 7 at the time the task requests are received and transmitted for processing. In performing these sub-tasks, the external processing platforms 10 may have limited or otherwise restricted access to the models and/or other data stored in the internal memory 8.

For example, the task request handling modules 6 may receive a ML/AI task request requiring more processing resources than are currently available via the one or more internal computing devices 5 and/or the third party computing devices 7. The task request handling modules 6 may then segment the task request into sub-tasks and identify an external processing platform 10 suitable to perform one or more of the sub-tasks that the internal components 2 are unable to process. The task request handling modules 6 may submit the one or more sub-tasks to the external processing platform 10, where the sub-task may be completed and returned to the internal components 2 via the network 4.

Generally, the public storage 11 may be one or more secured public storage devices configured to store data associated with ML/AI task request processing. The public storage 11 may include a secured cloud-based storage system. More specifically, the public storage 11 may store information related to the ML/AI task requests, and make this information available to one or more devices, such as the one or more internal computing devices 5, the third party computing devices 6, and/or the external processing platforms 10. The information stored on the public storage 11 may include data, results, logs, and/or other information related to the ML/AI task requests, and may be stored on the public storage 11 before, during, and/or after processing the ML/AI task requests.

For example, the task request handling modules 6 may receive a ML/AI task request and remove any identifying data associated with the request (e.g., de-identify the task request). This identifying data may be necessary during the processing of the task request, and as a result, may need to be accessed by one or more of the processing devices (e.g., 5, 6, 10) available to the system 1. Accordingly, the task request handling modules 6 may store this identifying data on the public storage 11 to facilitate access to the identifying data by any associated processing device (5, 6, 10).

Although the computing resource leveraging system 1 is shown to include one or a limited number of the various internal components 2 and of the external components 3, it should be understood that different numbers of any or each of these components may be utilized in various embodiments. The cloud-based configuration of the computing resource leveraging system 1 may provide various advantages, such as enabling near real-time uploads and downloads of information, as well as providing additional computing resources needed to handle the monitoring, matching, modeling, and optimization tasks described herein.

Exemplary System Workflow

Figure 1B:
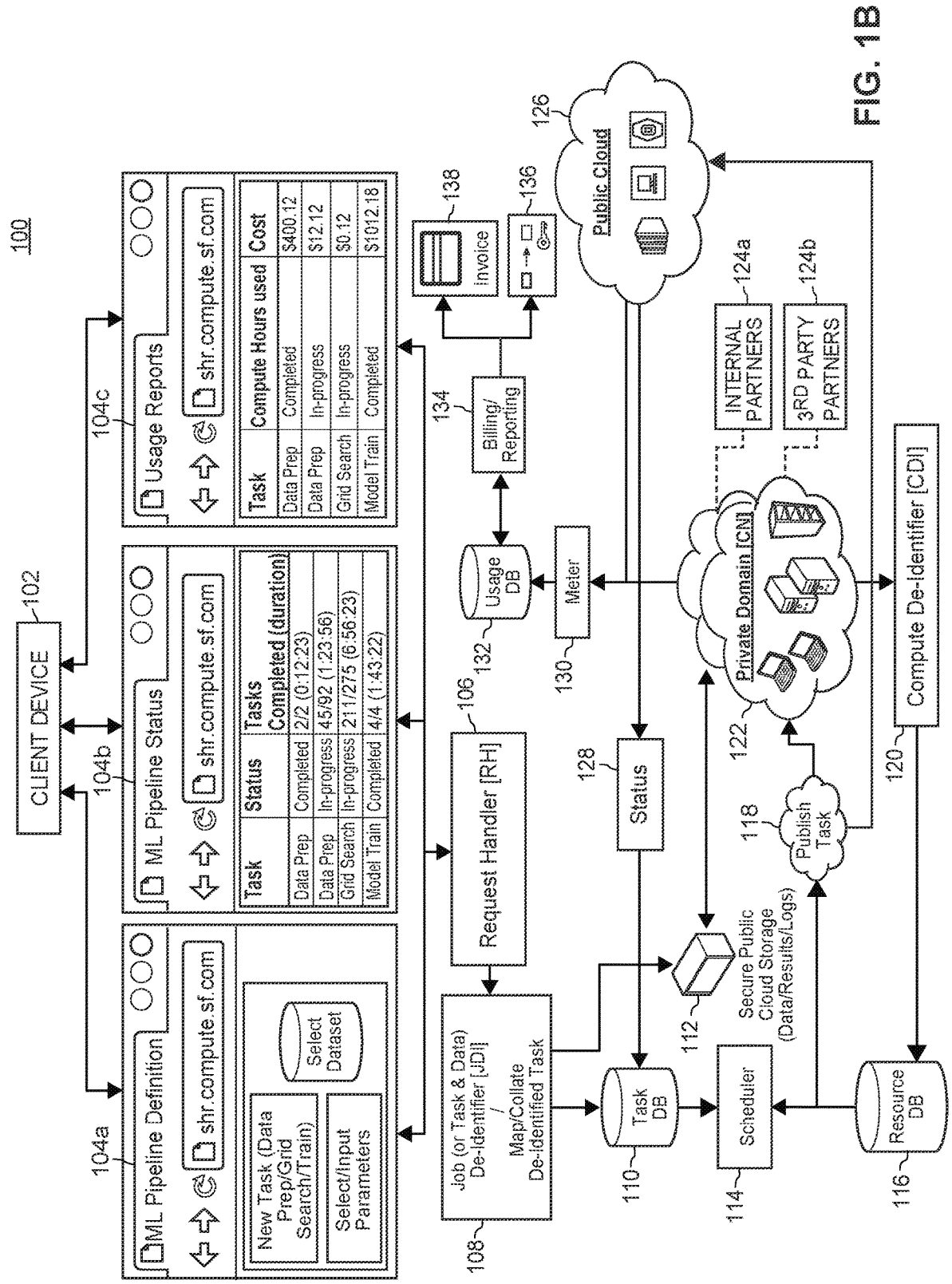
FIG. 1B is a block workflow diagram of an exemplary system for leveraging unused/inactive computing resources, in accordance with embodiments herein.

FIG. 1B is a block workflow diagram of an exemplary system 100 for leveraging unused/inactive computing resources. The exemplary system 100 may include a client device 102 that may be included in the client devices 9 of the external components 3 of system 1. The client device 102 may be configured to generate a ML/AI task request, that may be transmitted (e.g., across network 4) to the internal components 2. The client device 102 may display a number of user interfaces, such as interfaces 104a, 104b, and 104c, which a client may use to interact with the internal components 2. The client may interact with the user interfaces (104a, 104b, 104c), via the client device 102 to perform a variety of functions. More specifically, the client may input ML/AI task requests, data, and or other information into a pipeline definition interface 104a, and may receive processing reports, billing information, and/or other information from a pipeline status interface 104b and a usage report interface 104c.

In the pipeline definition interface 104a, a user may enter information related to their ML/AI task request. For example, the client may specify the type of task included in the request, such as data preparation, grid searching, and/or other tasks. The client may additionally include a dataset to be used when performing the task request. If the task request includes training a ML model, the client may specify a dataset to be used in training the model. The client may further include input parameters to guide the internal components 2 with regard to the ML/AI task request processing. The input parameters may include timing thresholds, data thresholds, starting points/values, and/or ending points/values associated with the data included with the training request.

The pipeline status interface 104b and the usage report interface 104c may provide a user with updated information with regard to the task request made with, for example, the pipeline definition interface 104a. The pipeline status interface 104b may provide a client with updates regarding the processing of the task request. For example, if a client's task request is segmented into four sub-tasks, each task may be accepted by and transmitted to an independent node (e.g., internal computing devices 5). The four nodes processing the sub-tasks may perform their respective tasks at different paces, and may each report their progress for display on the pipeline status interface 104b. The four nodes may also report their performance/logged time processing the sub-tasks to facilitate determining a cost associated with the node activity. Once calculated, the costs associated with the sub-task performances may be displayed for the client in either a total amount or in an itemized fashion in the usage report interface 104c.

In any event, after the client submits a task request to be processed, the task request may be received at the request handler 106. Generally speaking, the request handler 106 may determine whether the system 100 may perform the task request. Namely, the request handler 106 may check the scheduled, ongoing, and completed tasks processed by the system 100 to determine whether the received task request is a duplicate of a previously received task request. If the request handler 106 determines that the received task request is a duplicate of a prior received task request, the request handler 106 may generate an error message, an alert, and/or any other suitable indication to convey to the client that the received task request may not be processed by the system 100. However, if the request handler 106 determines that the received task request is not a duplicate, the request handler 106 may forward the task request to a job de-identifier 108.

The job de-identifier 108 is generally responsible for creating self-contained sub-tasks in conjunction with de-identifying the data submitted as part of the task request. As mentioned, ML/AI tasks may typically be divided into multiple sub-tasks that may be independently executed. The job de-identifier 108 may analyze the task request received from the request handler 106 to identify one or more sub-tasks comprising the task request, and remove any identifying information from the sub-tasks. Moreover, once the sub-tasks are executed, the job de-identifier 108 may collate (e.g., reassemble) the sub-tasks and any identifying information included into a processed task request for output to the client.

For example, assume the request handler 106 forwards a task request to the job de-identifier 108 containing instructions to perform tasks A, B, and C. The job de-identifier 108 may analyze the task request and divide the task request into three sub-tasks, including a first sub-task for task A, a second sub-task for task B, and a third sub-task for task C. Each of the first, second, and third sub-tasks may instruct their respective processors (e.g., nodes) to perform tasks A, B, and C, respectively. As a result, the first, second, and third sub-tasks may be performed independently of each other, which increases the efficiency of the overall processing of the task request by distributing the processing workload across multiple processors.

The job de-identifier 108 may also remove any identifying information from each of the sub-tasks. The identifying information may be any information embedded or otherwise included in the task request and/or sub-tasks that may identify the client or generally allow the task request to be traced back to the client (e.g., client name, IP address, computing device ID, etc.). In certain embodiments, the job de-identifier 108 may remove any identifying information from the task request, and subsequently segment/divide the task request into sub-tasks.

After dividing the task request into one or more sub-tasks and removing any identifying information, the job de-identifier 108 may store the sub-tasks in a task database 110 and the identifying information in a secure public cloud storage 112. The task database 110 may be included in the internal memory 8, and may store all task requests forwarded from the job de-identifier 108. As the processing of task requests progresses, the task database 110 may receive and store status updates associated with individual task requests. If the client that submitted a particular task request submits a request for an update regarding the progress of a particular task request, the request handler 106 may query the task database 110 to retrieve an updated status associated with the particular task request. The secure public cloud storage 112 may generally be any suitable public cloud storage system (e.g., public storage 11) configured to allow access to the identifying data associated with each task request. The identifying data may be securely stored in this manner to allow both the internal components 2 as well as any external components 3 (e.g., external processing platforms) access to the identifying information if the identifying information is necessary to complete some portion of the task request.

In any event, the task database 110 may forward the sub-tasks to a scheduler 114, where the sub-tasks are scheduled for processing. As described further herein, the scheduler 114 may analyze each received sub-task to determine (i) a priority level associated with the sub-task, (ii) a resource requirement associated with the sub-task (e.g., based on a user-requested resource requirement, a prior execution of the sub-task, and/or a prior execution of a similar sub-task for a similarly sized dataset or combinations thereof), and (iii) a schedule position for the sub-task. The priority level associated with the sub-task may indicate a relative timeline for completion of the sub-task, and/or how the scheduler 114 should modify the schedule position of the sub-task to in view of the relative timeline for completion or the priority level of another sub-task. The resource requirement associated with the sub-task may indicate a number of processors/available memory (e.g., CPUs, GPUs, etc.) required or estimated to be required to complete the sub-task. The schedule position for the sub-task may indicate the sub-task's position within a queue of sub-tasks waiting to begin processing. For example, a sub-task may be fifth in line to begin processing in a certain processor, and as a result, may have a schedule position of five.

When evaluating the resource requirement, the scheduler 114 may access the resource database 116 to analyze the current statuses of available computing resources. The resource database 116 may catalog all computing resources included in the system 100 to process task requests including a current status for each computing resource. Specifically, the resource database 116 may receive updated statuses corresponding to each computing resource, for example, based upon a predetermined frequency or may poll each computing resource in response to requests for status updates from the scheduler 114. Moreover, each computing resource listed within the resource database 116 may be partitioned into categories including, for example, memory capacity and CPU, and may further have additional labels (e.g., computing cluster, device type, location, department (within a business)) within the resource listing to more readily identify each particular computing resource.

Once the task request is next in the queue for execution, the scheduler 114 may publish the task request 118 to determine which node(s) may accept the task request for processing. The publication may include, for example, the minimum processing power and available memory required to complete the task. One or more nodes may accept the published task request and submit an updated node status to the computing de-identifier 120, which may then remove any identifying information associated with the node from the updated node status. The computing de-identifier 120 may then transmit the de-identified updated node status to the resource database 116 to update the status of the one or more nodes that accepted the task request. In general, the scheduler 114 may first publish the task request 118 to computing devices located on a private domain 122 (e.g., internal components 2), that may include internal partners 124a (e.g., internal computing devices 5) and/or third party partners 124b (e.g., third party computing devices 7). The internal partners 124a and the third party partners 124b may each include one or more computing devices (nodes). The internal partners 124a may generally refer to employees or other entities of an organization that moderates or otherwise operates the private domain 122.

For example, a business may utilize the private domain 122 as part of their daily operations to communicate internally, and employees of the business may have access to the private domain 122 as a condition of their employment. Continuing this example, the third party partners 124b may be vendors, consultants, and/or other trusted outside parties (e.g., business partners) that the business may allow to have access to the private domain 122 to access necessary information from within the private domain 122. Consequently, the business may additionally permit members of the third party partners 124b to participate in the system 100 by connecting additional computing devices associated with the third party to the private domain.

As a result, the scheduler 114 may additionally access the third party partner 124b computing devices to process task requests on the private domain 122 when publishing a task request 118 and/or external components 3 (e.g., external processing platforms 10). In this manner, the internal partners 124a of the business and the third party partners 124b of the business may be preferentially designated as computing resources to process the received ML/AI task requests, and consequently, may primarily receive any compensation resulting from the use of their respective computing resources.

In the event that no computing resource included in the private domain 122 is capable and/or available to process the published task request, the scheduler 114 may forward the task request to a public cloud 126 (e.g., external processing platforms 10) for processing. The public cloud 126 may generally include any publicly available cloud-based processing platform, such as Amazon Web Services (AWS), Microsoft Azure, Google Cloud Platform, VMWare, etc. Of course, the scheduler 114 may also preemptively determine that the task may be exclusively processed on the public cloud 126 based on the current resource availability (e.g., CPU, GPU, memory, etc.) of the private domain 122.

Each public cloud-based processing platform may receive tasks, sub-tasks, etc. as overflow from the task request processing of the private domain 122. For example, if a high-priority task request requires performance of sub-tasks A, B, and C, the scheduler 114 may attempt to publish the task 118 to the private domain 122 as quickly as possible to begin task processing.

However, if the private domain only has two processors available at the time the task is published 118, the scheduler 114 may forward sub-tasks A and B to the private domain 122 and forward sub-task C to the public cloud 126. For example, the other private domain nodes may be in an active state (e.g., users/owners of the private nodes are currently utilizing the nodes for their own use), processing other task requests, or otherwise occupied at the time the scheduler 114 attempts to begin task processing.

During task processing, each computing node within the private domain 122 and the public domain 126 may periodically or upon request submit processing status updates to a status module 128. The status module 128 may then forward these processing status updates to the task database 110 for storage. The processing status updates may include information regarding the amount of processing with respect to a particular task/sub-task the node has accomplished, and/or how much time the node may require to complete processing the task/sub-task.

In reference to the above example, the status module 128 may request a status update from the private domain 122 regarding sub-tasks A and B, and may request a status update from the public cloud 126 regarding sub-task C. The nodes from the private domain 122 processing sub-tasks A and B may submit respective processing status updates indicating that sub-task A is 50% complete and may require 3 additional hours of processing time, and that sub-task B is 65% complete and may require 2 additional hours of processing time. The node from the public cloud 126 processing sub-task C may submit a processing status update indicating that sub-task C is 20% complete and may require 6 additional hours of processing time. The status module 128 may forward these processing status updates to the task database 110, where they may be stored as a set of updates for the task request including sub-tasks A, B, and C.

Similar to the processing status updates, each computing node within the private domain 122 and the public domain 126 may periodically or upon request submit resource usage data updates to a meter module 130. The meter module 130 may then forward these resource usage data updates to a usage database 132 for storage. The resource usage data updates may include information regarding the amount of processing time/power required to perform a specific task/sub-task. Continuing the above example, the nodes from the private domain 122 may submit resource usage data updates indicating that sub-tasks A and B have consumed 3 hours of processing time and 2.5 hours of processing time, respectively. The node from the public cloud 126 may submit a resource usage data update indicating that sub-task C has consumed 2 hours of processing time. The meter module 130 may collate these resource usage data updates from the three nodes and transmit the group of resource usage data updates to the usage database 132 to update the usage data with respect to the task request including sub-tasks A, B, and C.

Eventually, upon request or at the conclusion of processing the task request, a billing/reporting module 134 may retrieve the usage data corresponding to the task request and report the usage data to the client. The billing/reporting module 134 may generally be responsible for compiling and transmitting the usage data associated with a particular task request to a client (e.g., via second and/or third user interface 104b, 104c) and determining a cost report corresponding to the value of processing time spent processing the task request. Usage data associated with incomplete tasks due to node issues may not be billed by the billing/reporting module 134. However, incomplete tasks due to user initiated interruptions may be included as part of the billed computing resource usage. Generally, node issues/errors can be derived based on the infrastructure status updates (e.g., as discussed herein with respect to the node availability agent 402a in FIG. 4).

Accordingly, in some embodiments, the billing/reporting module 134 may calculate profit shares for the internal partners 124a, the third party partners 124b, and the public cloud 126 based upon the amount of processing each set of computing devices contributed to processing the task request. The billing/reporting module 134 may then generate pay stubs/checks 136 for the respective entities receiving payment as a result of processing the task request, and may generate an invoice 138 for display to the client requesting payment as a result of processing the task request. The invoice 138 may appear as an itemized list of the sub-tasks and their associated processors included in the overall task request processing (e.g., as shown in the third user interface 104c).

Exemplary Processing Workflow

Figure 2:
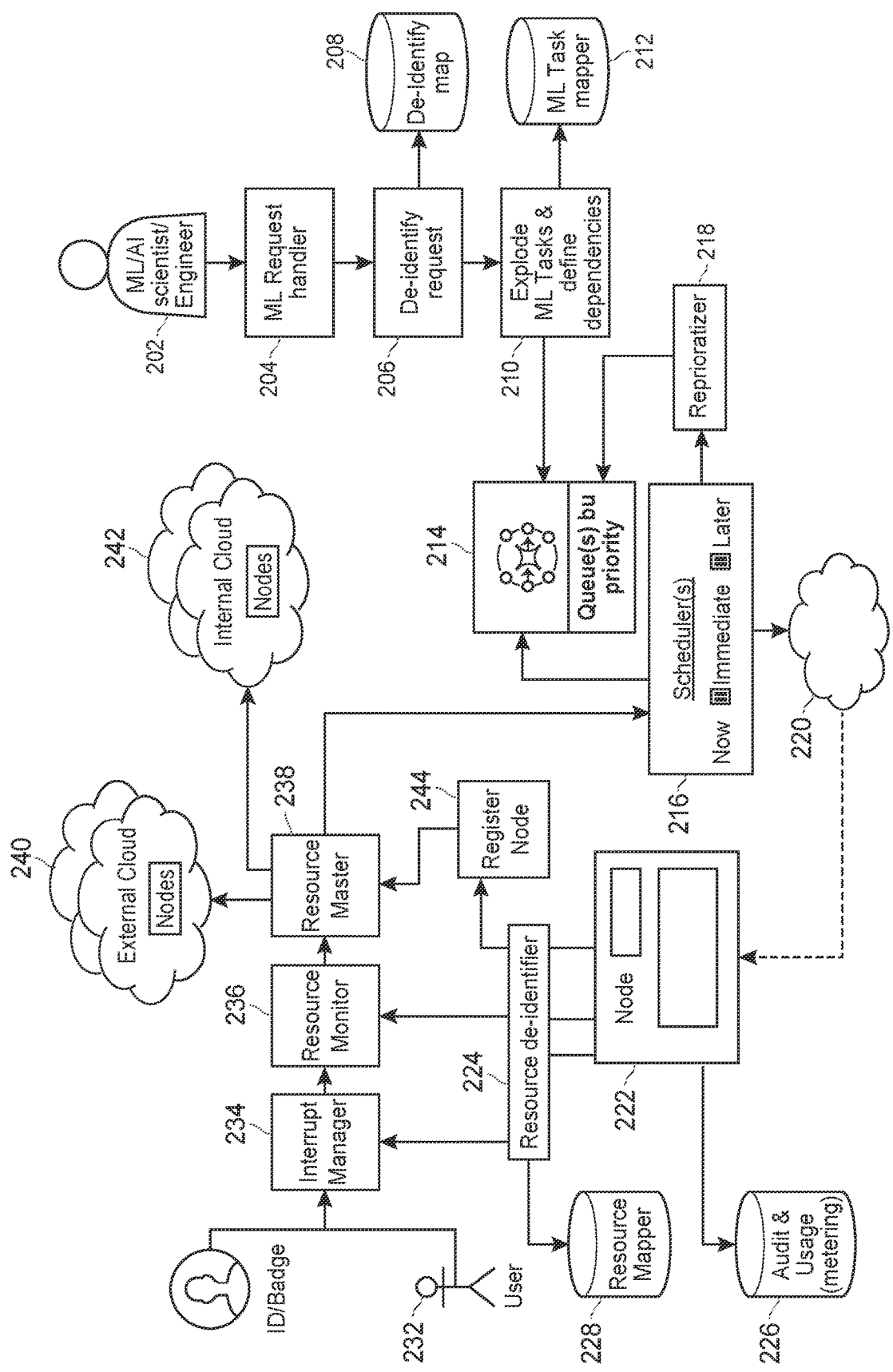
FIG. 2 is a block processing workflow diagram for leveraging unused/inactive computing resources, and in accordance with embodiments herein.

FIG. 2 is a block processing workflow diagram 200 for leveraging unused/inactive computing resources. The block processing workflow diagram 200 includes a ML/AI client 202 that may submit a task request that is received by a ML request handler 204 (e.g., request handler 106). The ML request handler 204 may forward the task request to be de-identified 206 (e.g., by the job de-identifier 108). De-identifying the task request may include storing the de-identified information to a de-identification map 208, which may outline, track, or otherwise associate the de-identified information with the particular task request.

In any event, the de-identified task request may then be forwarded for division into one or more sub-tasks 210 (e.g., via the job de-identifier 108). Similar to the de-identification, the division of the task request into one or more sub-tasks may be transmitted to and stored in a ML task mapper 212, so that the particular organization/breakdown of the task request into the one or more sub-tasks may be accurately recreated once each of the sub-tasks comprising the task request have been successfully processed.

The one or more sub-tasks may then be transmitted for scheduling (e.g., via the scheduler 114). Each sub-task may be individually analyzed and prioritized for processing, and placed in a priority queue 214 accordingly. Generally, the sub-tasks may be prioritized based upon a variety of characteristics, such as anticipated processing time, processing power requirements, available processing resources, overall priority of task request, etc. Moreover, each sub-task may be prioritized, in part, based upon the current schedule of task requests to be processed. A scheduler 216 may include the all or a portion of the current schedule of task requests to be processed. The priority queue 214 may thus receive the current schedule from the scheduler 216, and may determine the priority level associated with a particular sub-task and a corresponding schedule position for the sub-task within the scheduler 216. In some embodiments, the priority queue 214 may include multiple queues for tasks/sub-tasks based upon the type of task/sub-task (e.g., data prep, gird searching, training, etc.), processing requirements (e.g., robust processor, mid-level processor, etc.), and/or any other suitable categorization(s) or combinations thereof.

For example, the schedule position within the scheduler 216 may include a "now" designation, an "immediate" designation, a "later" designation, and/or any other suitable designation or combinations thereof. Each of the designations may indicate a relative order of processing the current task requests configured to optimize the available computing resources included within the processing workflow diagram 200 (e.g., private domain 122 and public cloud 126). The priority queue 214 may place any task/sub-task receiving a "now" designation at the front of the queue corresponding to that task/sub-task. The priority queue 214 may place any task/sub-task receiving an "immediate" designation at or near the front of the queue corresponding to that task/sub-task if there are no tasks/sub-tasks in the queue with a "now" designation currently in the queue. The priority queue 214 may place any task/sub-task receiving a "later" designation at the front of the queue corresponding to that task/sub-task only if there are no tasks/sub-tasks with either "now" or "immediate" designations currently in the queue. Further, the scheduler 216 may access a resource master 238 to retrieve resource identifications (IDs) that may indicate a name, one or more processors, and/or a memory associated with each of the available computing resources.

Tasks and/or sub-tasks may need to be reorganized and/or re-prioritized as new tasks/sub-tasks arrive at the priority queue 214, as computing resources become available/unavailable, or in response to new client input changing the designation of one or more tasks/sub-tasks. A reprioritizer 218 may upon receipt of new tasks/sub-tasks or new client input transmit reprioritization commands to the priority queue 214 to change the priority designations of one or more tasks/sub-tasks. For example, the ML/AI client 202 may input new information (e.g., via the first user interface 104a) indicating that a submitted task request is a lower priority than previously indicated. The reprioritizer 218 may receive this new information from the ML/AI client 202, retrieve the task(s)/sub-task(s) corresponding to the submitted task request from the scheduler 216, assign them an updated priority designation, and transmit the task(s)/sub-task(s) to the priority queue 214 to be assigned new positions within their respective queues for processing.

As another example, assume a first sub-task has a priority designation of "immediate" when it arrives to the front of the priority queue 214, at which point, the scheduler 216 transmits the first sub-task to a first node for processing. Further, assume that the first node becomes unavailable (e.g., a user/owner of the first node activates the node for their personal use) during the processing of the first sub-task. The first sub-task may remain at the first node waiting for the first node to be placed into an inactive state (e.g., the user/owner of the first node deactivates the first node after finishing their personal use), or in certain embodiments, the first sub-task may return to the reprioritizer, where the first sub-task may receive a "now" designation. Accordingly, the first sub-task may be placed at the front of the priority queue 214 and quickly placed with a second node by the scheduler 216 to continue processing.

In some embodiments, the priority queue 214, scheduler 216, and the reprioritizer 218 may operate in accordance with a machine learning model configured to prioritize, schedule, and monitor task(s)/sub-task(s). The machine learning model may be a supervised or unsupervised machine learning model, and may include any suitable machine learning algorithm. Additionally, the machine learning model may be trained on past priority designations, past received resource IDs, and past processing status updates and/or resource usage updates (e.g., as received by the status module 128 and meter module 130, respectively). The machine learning module may include or otherwise incorporate a convolutional neural network (CNN), logistic regression, decision trees, linear regression, k-nearest neighbors, and/or any other suitable machine learning algorithm.

Accordingly, the machine learning model may develop correlations between the types of tasks/sub-tasks received at the priority queue 214 and the types of computing resources available (via the resource IDs) to more efficiently and effectively schedule received task(s)/sub-task(s). These correlations may work to minimize the amount of reprioritization required from the reprioritizer 218 and the overall amount of wasted processing time/power resulting from not transmitting task(s)/sub-task(s) to an optimal computing resource during an initial prioritization and scheduling of the task(s)/sub-task(s).

Once a task/sub-task reaches the front of the queue, the scheduler 216 may publish the task/sub-task 220 for processing at a node 222. The node 222 may include a task executor (not shown), a request handler (not shown), and a reporting agent (not shown) to communicate with a resource de-identifier 224 and an audit module 226. For example, the task executor and request handler may facilitate the processing of the task(s)/sub-task(s) and the forwarding of the processed task/sub-task data to the resource de-identifier 224. The reporting agent may collect and collate the processing time/power data from the node 222 and submit that data to the audit module 226. It is to be appreciated that the task executor, the request handler, and the reporting agent may perform any suitable task to facilitate the node 222 communicating to various other components within the processing workflow diagram 200.

The resource de-identifier 224 may receive the processed task(s)/sub-task(s) data from the node 222 (e.g., via the task executor, the request handler, and/or the reporting agent) and remove any identifying information associated with the node 222 from the processed task(s)/sub-task(s) data. The identifying information associated with the node 222 may include any information embedded or otherwise included in the processed task(s)/sub-task(s) data that may identify the node 222 or generally allow the processing of the task(s)/sub-task(s) to be traced back to the node 222 (e.g., node 222 user/owner name, IP address, node 222 ID, processor type/number, memory type, etc.).

The audit module 226 may receive the processing time/power data from the node 222 to determine reportable data corresponding to the task request processing, such as estimated processing time remaining, amount of processing completed, current/estimated charge for processing resources used, etc. Generally, the audit module 226 may request/retrieve the processing time/power data from the node 222 in response to a client request for processing updates. For example, if a client utilizing their client device 102 inputs a request for an update regarding their task request, the audit module 226 may request/retrieve the processing time/power data from the node 222 before, during, and/or after the node 222 is finished working on the client's task request. In some embodiments, the audit module 226 may periodically poll the node 222 to retrieve the processing time/power data.

In any event, the resource de-identifier 224 may transmit a portion of the de-identified data to a resource mapper 228 that may be configured to track the processing progress of the node 222. For example, the resource mapper 228 may include a listing of each task(s)/sub-task(s) the node 222 has or is currently processing. For example, if the node 222 is processing a first task/sub-task and switches from an inactive to an active state (e.g., the node 222 user/owner activates the node 222 for their personal use), the task/sub-task may be reprioritized and transmitted to another node. Following the reprioritization and transfer, the node 222 may transition to an inactive state and may receive an updated processing job to process a second task/sub-task. Accordingly, the node 222 may transmit the updated processing job to the resource mapper 228 for storage.

In some embodiments, the resource mapper 228 may track the allocation of resources associated with the node 222, such as processor(s) and memory. For example, the node 222 may allocate different portions of available processing power and/or memory capacity to process different task(s)/sub-task(s). Accordingly, the node 222 may transmit this resource allocation data (in real-time, periodically, or before or after processing the task(s)/sub-task(s)) to the resource mapper 228 for storage.

The resource de-identifier 224 may also transmit data from the node 222 to an interrupt manager 234. As previously mentioned, the node 222 may process the task(s)/sub-task(s) when in an inactive state. The node 222 may receive an ID 230, password, and/or other credentials indicating that a user 232 has activated the node 222. When the node 222 is activated, the interrupt manager 234 may transmit a signal to the node 222 to cease processing and to return the data associated with the task(s)/sub-task(s) being processed by the node 222. The interrupt manager 234 may transmit an indication of such an interrupt to a resource monitor 236 that may, for example, track the performance of the node 222 and log any interrupts that take place when the node 222 is processing an accepted task(s)/sub-task(s). If the resource monitor 236 receives an indication from the interrupt manager 234 that the node 222 has transitioned from an inactive state to an active state while processing an accepted task(s)/sub-task(s), the resource monitor 236 may store that indication and/or transmit all or a portion of the indication to a resource master 238.

The resource master 238 may generally act as an information hub/relay for all of the computing resources included in the processing workflow diagram 200. The resource master 238 may be communicatively connected to an external cloud 240 containing one or more nodes, an internal cloud 242 containing one or more nodes, and a register node 244. The register node 244 may, for example, retrieve/request identification information associated with the node 222 to transmit to the resource master 238. Moreover, each node represented in the clouds 240, 242 may include a register node 244 configured to communicate identification information from the nodes to the resource master 238.

Each of the nodes represented in the external cloud 240 (e.g., public cloud 126, external processing platforms 10), the internal cloud 242 (e.g., private domain 122, internal computing resources 5, third party resources 7), and the node 222 may report operating information and data to the resource master 238. For example, the resource master 238 may act as a repository for resource IDs (e.g., node name, number of processors, memory capacity, etc.) and/or other data associated with each node connected to the resource master 238. In this manner, the resource master 238 may provide resource IDs and other data to the scheduler 216 to facilitate accurate and efficient resource allocation upon receipt of new or reprioritized task(s)/sub-task(s).

Exemplary Computing Node Organizational Hierarchy

Figure 3:
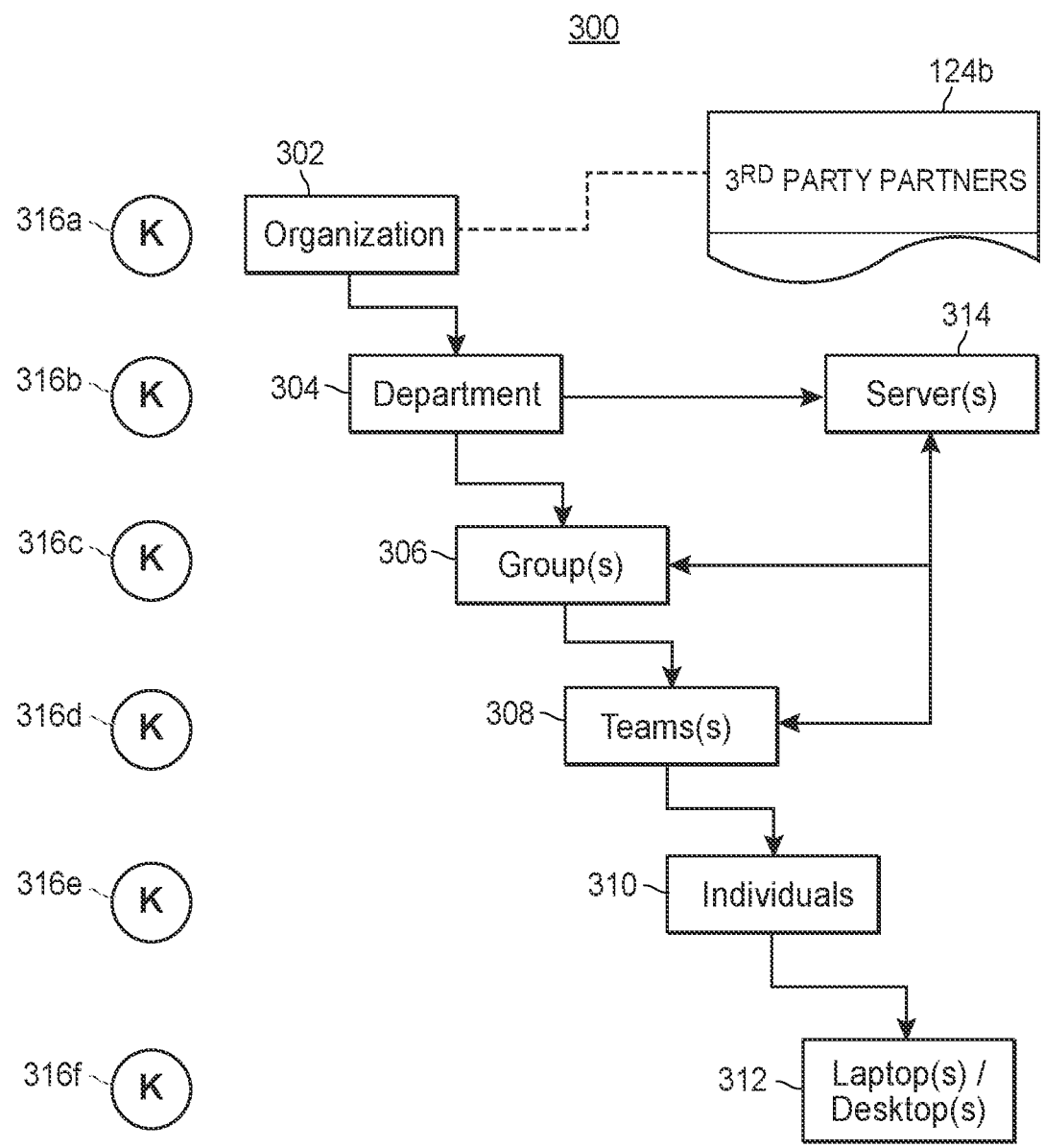
FIG. 3 is a block diagram of an example organizational hierarchy for computing nodes configured to perform machine learning tasks when unused/inactive, in accordance with embodiments herein.

FIG. 3 is a block diagram of an example organizational hierarchy 300 for computing nodes configured to perform machine learning tasks when unused/inactive. In general, the hierarchy 300 may represent various levels of computing node groupings that a business or other organization 302 may implement within an internal computing environment (e.g., internal components 2, private domain 122). These levels of computing node groupings may allow more streamlined processing of task requests by aggregating and tracking data flow at each level. An organization 302 may not issue identical computer hardware/software for each individual, department, team, and/or other groupings within the organization 302. Moreover, the hardware/software issued to different groups within the organization 302 may be utilized at different times and in different ways.

For example, a first division of the organization 302 may receive more robust hardware and different software platforms than a second division. The first division may also utilize their computing resources more frequently, as they may have remote access to the organization 302 servers, while the second division does not. Accordingly, the organization 302 may collect similar hardware/software into groups to more accurately characterize the usage rates and processing capabilities of the available computing resources.

The organization 302 may be connected to the set of third party partners 124b (e.g., that may include the third party computing devices 7). The organization 302 encompasses all departments 304, groups 306, teams 308, individuals 310, and laptop(s)/desktop(s) 312 associated with the organization 302. Each department 304, group(s) 306, and team(s) 308 may be connected to server(s) 314 run, moderated, or otherwise controlled by the organization 302. Each individual 310 and their respective laptop(s)/desktop(s) 312 may also connect to the server(s) 314.

Each level of the organizational hierarchy 300 may further include a respective kill switch 316a-f, which may enable/disable participation of the respective level in the processing environments described with respect to FIGS. 1A and 1B (e.g., systems 1, 100). For example, it may be critical that a department 304 of the organization 302 utilize their respective computing resources during the entirety of a first duration. The department 304 may then activate/toggle their respective kill switch 316b to disable their participation within the processing systems 1, 100.

Moreover, each respective kill switch 316a-f may have a cascading effect on the subordinate levels of the organizational hierarchy 300. For example, assume the first respective kill switch 316a associated with the organization 302, and optionally with the third party partners 124b, is toggled to disable the organization's 302 participation in the processing systems 1, 100. The first respective kill switch 316a may then disable the organization 302, the department 304, the group(s) 306, the team(s) 308, the individuals 310, and the laptop(s)/desktop(s) 312 from participation in the processing systems 1, 100.

As another example, assume the third respective kill switch 316c associated with each respective group 306 of the organization 302 is activated to disable a first group's 306 participation in the processing systems 1, 100. The third respective kill switch 316c may then disable the first group 306, each team 308 under the first group 306, each individual 310 under the first group 306, and each laptop(s)/desktop(s) 312 under the first group 306 from participating in the processing systems 1, 100. However, the overall organization 302, the departments 304, and the other groups 306 (along with their associated team(s) 308, individuals 310, and laptop(s)/desktop(s) 312) that did not activate the third respective kill switch 316c may still remain active in the processing systems 1, 100.

Exemplary Computing Node Architecture

Figure 4:
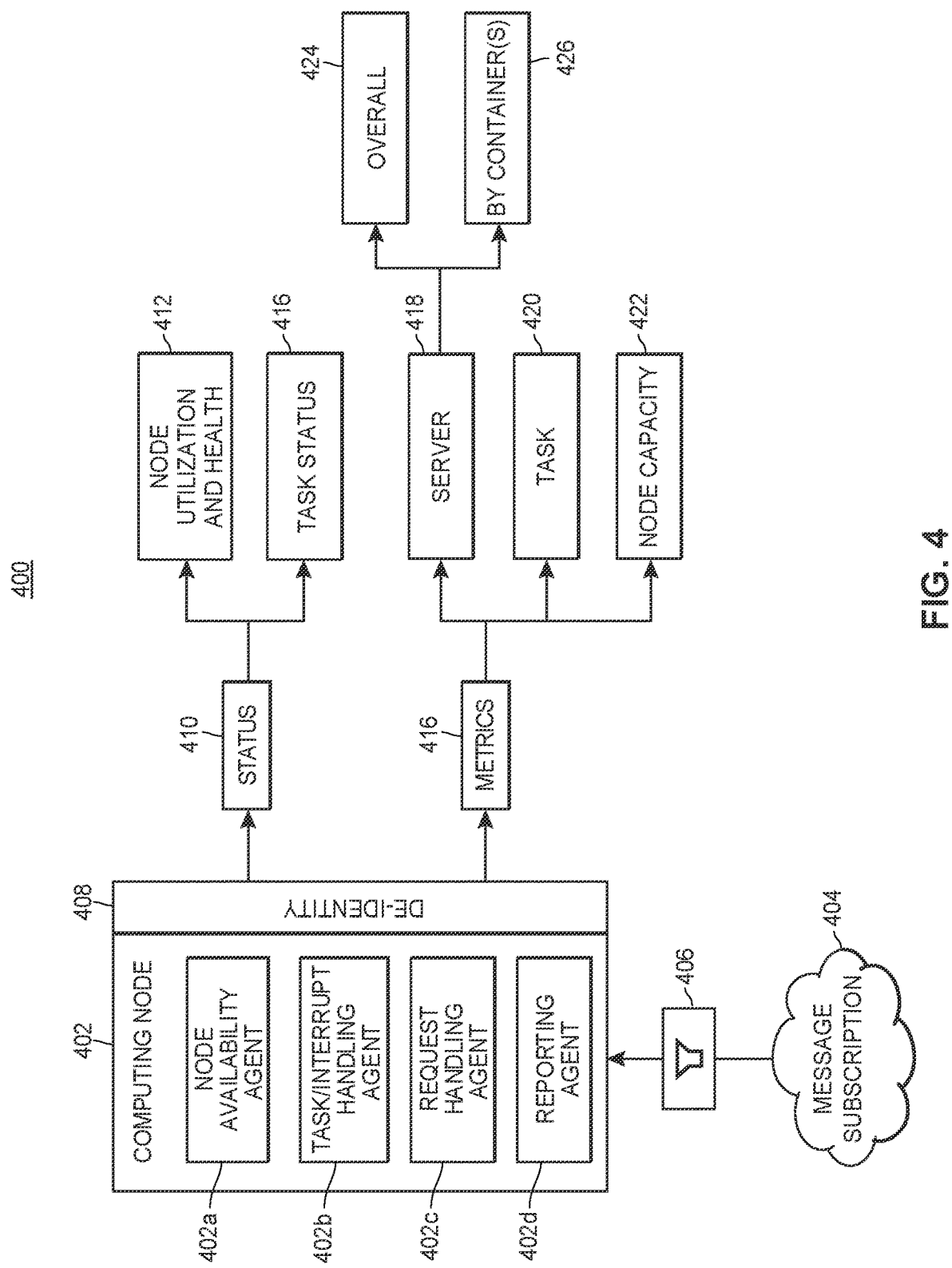
FIG. 4 is a block diagram of an exemplary computing node architecture configured to perform machine learning tasks when unused/inactive, in accordance with embodiments herein.

FIG. 4 is a block diagram of an exemplary computing node architecture 400 configured to perform machine learning tasks when unused/inactive. The architecture 400 includes a computing node 402 that further includes a node availability agent 402a, a task/interrupt handling agent 40b, a request handling agent 402c, and a reporting agent 402d. Generally speaking, each of the agents 402a-d may be active at all times on the node 402, and may transmit periodic signals (referenced herein as "heartbeats") to allow monitoring of the node 402 status.

The node availability agent 402a may evaluate the current activity status (e.g., active/inactive) and the current workload of the node 402 to determine an availability of the node 402 to accept new processing tasks. If the node availability agent 402a determines that the node 402 is in an inactive state and is not currently processing a task request, the agent 402a may publish an availability status indicating that the node 402 is accepting new processing tasks. The node availability agent 402a may determine the current activity status of the node 402 based upon, for example, published schedules for the node 402 (e.g., schedules and/or work hours maintained by an organization 302), the current health of the node 402 (e.g., processing capabilities, connectivity health, etc.) and/or based upon the node 402 user's activity with the node 402 (e.g., deactivate task processing if the user activates the node 402).

The task/interrupt handling agent 402b may generally receive task requests and interrupt signals. The task requests may include one or more task(s)/sub-task(s) for the node 402 to process. The interrupt signals may indicate that the node 402 may cease processing any current task requests. Upon receipt of either task requests or interrupt signals, the task/interrupt handling agent 402b may pass the received signals to the request handling agent 402c. The request handling agent 402c may generally instantiate accepted task requests and report interrupt signals/requests to indicate that any current task requests may need to be transmitted to an alternate computing node for processing.

The reporting agent 402d may record and transmit the current operating status of the computing node 402. The current operating status of the computing node 402 may include the processing progress of the computing node 402 with respect to instantiated task requests, and the capacity of the computing node 402 for new task requests. For example, the current operating status of the computing node 402 may indicate that the computing node 402 is operating at 65% of its maximum processing/memory capacity, and that the node 402 has completed 45% of the current task request.

Generally, the computing node 402 may be connected to a message subscription 404 that transmits messages for receipt at one or more nodes included in the larger scale processing system (e.g., processing systems 1, 100). The message subscription 404 may receive messages from a client or may automatically generate messages for one or more nodes based upon the task requests currently being processed within the system. In any event, the message subscription 404 may transmit one or more messages to a receiver 406 that may filter the messages received from the message subscription 404 to forward messages corresponding to the computing node 402 and discard messages not addressing or otherwise related to the computing node 402.

The computing node 402 may receive the messages from the receiver 406 and one or more agents 402a-d may process the received message. Typically, actions taken by the one or more agents 402a-d in response to a receive message may generate data to be stored in the architecture 400. Thus, the one or more nodes 402a-d may transmit the generated data to a de-identifier 408 that separates any identifying information included in the generated data from the remainder of the generated data. The de-identifier 408 may then transmit all or a portion of the identifying information and/or the remainder of the generated data to a status module 410 and/or a metric module 412.

The status module 410 may broadly receive and store information relating to the past, current, and predicted processing status of the computing node 402. The processing status of the computing node 402 may include the health and utilization of the computing node 402, and the progress of any current task requests being processed by the computing node 402. The health and utilization of the computing node 402 may include the amount of memory occupied by a current task request, processing time used to process the current task request, and/or any other suitable metric. The health and utilization data may be stored in the node utilization and health module 412. The progress of any current task requests being processed by the computing node 402 may include the completion percentage of the task request (e.g., 50% complete), any error encountered while processing the task request, and/or any other suitable metric. The progress of any current task requests being processed by the computing node 402 may be stored in the task status module 414. The status module 410 may access the information stored in the node utilization and health module 412 and the task status module 414 to estimate processing efficiency/capabilities with respect to the computing node 402. In this manner, the status module 410 may inform a decision to accept or deny a task request received from, for example, the message subscription 404.

The metrics module 416 may broadly receive and store information relating to the past, current, and predicted operating status of the computing node 402. As previously mentioned, the operating status of the computing node 402 may include the processing progress of the computing node 402 with respect to instantiated task requests, and the capacity of the computing node 402 for new task requests.

The metrics module 416 may include predictive models to calculate the predicted/expected operating status of the computing node 402 based upon the processing of past, current, and/or expected future task requests. In this manner, the status module 410 may inform a decision to accept or deny a task request received from, for example, the message subscription 404.

For example, assume a first task request is accepted by the computing node 402, and is scheduled for completion in five hours. The metrics module 416 may receive an operating status from the computing node 402 (e.g., via the de-identifier 408) indicating that 50% of the processing power of the computing node 402 (e.g., one or more cores of the computing node 402 processor(s)) is being utilized, and that the first task request is on schedule for completion within the five hour timeframe specified at acceptance. The metrics module 416 may then utilize this status update to predict the capabilities of the computing node 402 to accomplish future task requests within the provided time limit.

Further, assume that the computing node 402 receives a request to process a second task request that requires twice the amount of processing within a five hour time limit. The metrics module 416 may utilize the stored model and determine that the computing node 402 is capable of accepting and completing the second task request based upon the processing history associated with the first task request.

The metrics module 416 may store data received from the computing node 402 (e.g., via the de-identifier 408) in a server module 418, a task module 420, or a node capacity module 422. The server module 418 may store any information related to the overall processing system (e.g., processing systems 1, 100) that may include or otherwise impact the computing node 402. The server module 418 may store general information concerning the performance of the overall processing system in an overall server module 424.

The server module 418 may store more specific information about one or more portions of the overall processing system in the container module 426. For example, the computing node 402 may generate/receive a message indicating a variety of utilization metrics related to the computing node 402. Additionally or alternatively, the computing node 402 may generate/receive a portion of the overall processing system will be deactivated (e.g., one of the respective kill switches 316a-f may be toggled). The computing node 402 may forward these messages to the metrics module 416, which may in turn, store each message in the container module 426 and/or the overall server module 424.

The server module 418 may store data/information from messages associated with a current task request and or the operating status of the computing node 402 in the task module 420 and the node capacity module 422, respectively. For example, assume that the computing node 402 completes processing of a first task request, and the reporting agent 402d generates a message top indicate the completion of the first task request. The metrics module 416 may receive the message, and may further transmit the task identification and other related data to the task module 420. Accordingly, the metrics module 416 may transmit/store the processing information related to the performance of the computing node 402 to the node capacity module 422.

Exemplary Method for Leveraging Unused Computing Resources

Figure 5:
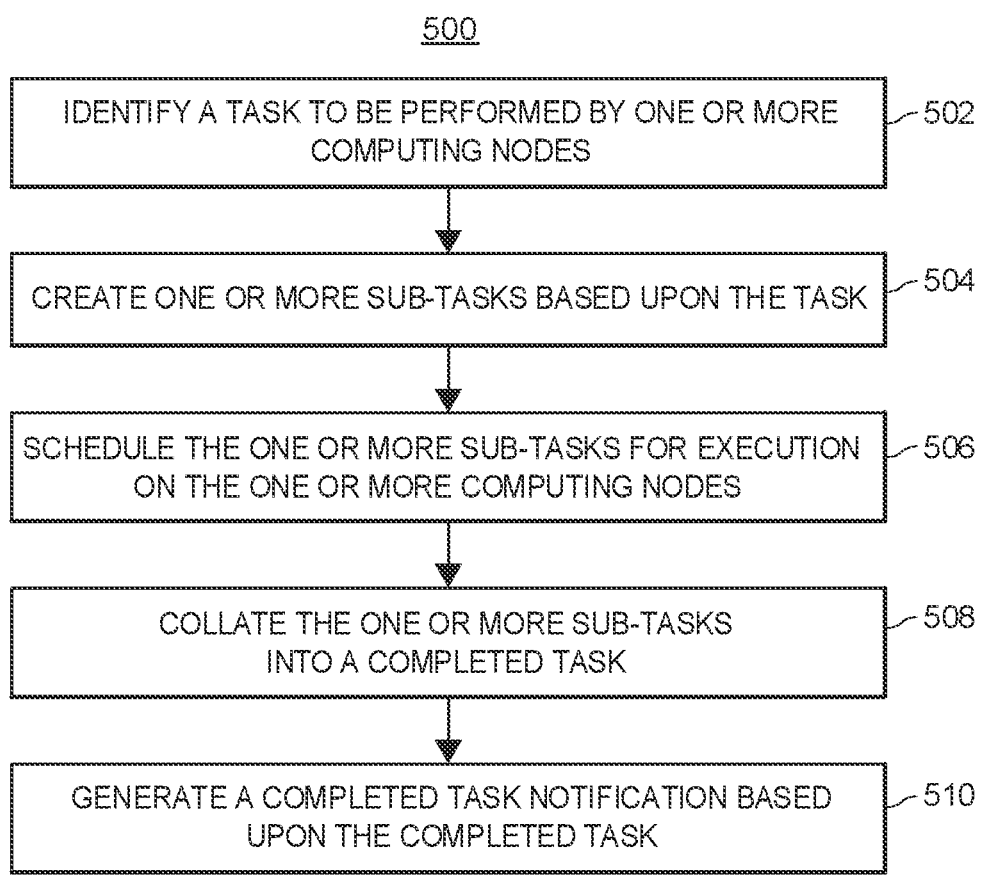
FIG. 5 is a flow diagram of an example method for leveraging unused/inactive computing resources, in accordance with embodiments herein.

FIG. 5 is a flow diagram of an example method 500 for leveraging unused/inactive computing resources. The method 500 begins by identifying a task to be performed by one or more computing resources (block 502). Each of the one or more computing resources may have an active state and an inactive state. The active state may indicate that a user/owner of the computing resource is currently using the computing resource for their own personal use. The inactive state may indicate that the user/owner is not currently using the computing resource for their own personal use, and for example, may have logged off the computing resource. Block 502 may be performed by, for example, the request handler 106 and/or the job de-identifier 108.

In some embodiments, the one or more computing nodes may include a first set of computing nodes and a second set of computing nodes. Each computing node in the first set of computing nodes may be a private computing node, and each computing node in the second set of computing nodes may be a public cloud-based computing node. The private computing nodes may each interconnect via a private server/network (e.g., private domain 122), and the public cloud-based computing nodes may be any suitable cloud-based processing platform (e.g., public cloud 126, such as Google Cloud Platform, AWS, Microsoft Azure, VMWare, etc.). In these embodiments, the active state of the private computing node may indicate a private user is utilizing the private computing node, and the inactive state of the private computing node may indicate a private user not utilizing the private computing node.

The method 500 may continue by creating one or more sub-tasks based upon the task (block 504). Each of the sub-tasks may generally be self-contained tasks that, when combined, result in the accomplishment of the task. For example, assume a received task requires performing steps A, B, and C. The method 500 may include dividing the task into a first sub-task to perform step A, a second sub-task to perform step B, and a third sub-task to perform step C. Block 504 may be performed by, for example, the job de-identifier 108.

In some embodiments, the method 500 may further include removing any identifying information from the received request prior to dividing the received request into sub-tasks. Alternatively, the identifying information may be removed from the sub-tasks. In any event, the removed identifying information may be stored on a public storage device to facilitate both public and private computing devices (e.g., private domain 122 and public cloud 126) accessing the identifying information as necessary to perform the received task requests.

The method 500 may continue by scheduling the one or more sub-tasks for execution on the one or more computing nodes (block 506). The one or more computing nodes may process/execute the one or more sub-tasks while in the inactive state. Public computing nodes (e.g., public cloud 126) may not have an active and an inactive state because they are not accessed for use by a singular user in a way that might interrupt the processing of any accepted task request. As a result, if a sub-task is accepted and received by a public computing node, then the public computing node may process the sub-task at any time. Block 506 may be performed by, for example, the scheduler 114 or the priority queue 214/scheduler 216/reprioritizer 218.

In certain embodiments, the method 500 may further include determining a resource requirement for the one or more sub-tasks based upon a resource model. For example, the resource model may estimate the amount of processing power required to process/execute a task request within a specified timeframe (e.g., number of hours, days, weeks, etc. as specified by the requesting client). Accordingly, if the resource model determines that the processing requirements of a particular task request exceed the capabilities of the system, the resource model may generate an alert signal for display to a client or other user indicating denial of the task request. The resource model may be a machine learning model, and the method further comprises training the machine learning model with (i) a set of prior task data, (ii) a set of prior node identifications, and (iii) a set of prior completed task data.

Further in these embodiments, the method 500 may include routing a task request including the resource requirement to each of the first set of computing nodes. In response, the scheduler 114, for example, may receive a set of node identifications including a node identification from each of the first set of computing nodes. The scheduler 114, for example, may then schedule the one or more sub-tasks for execution on the one or more computing nodes during the inactive state by applying the resource model to the set of node identifications. The resource model may indicate which of the first set of computing nodes may receive one or more sub-tasks by evaluating the node identifications, such as processors and/or memory included in each computing node.

In some embodiments, the method 500 may further include, during execution of the one or more sub-tasks, periodically requesting one or more status updates from each of the one or more computing nodes executing the one or more sub-tasks. The status updates may include information indicating the amount of processing completed/remaining with respect to the one or more sub-tasks, and a charge amount with respect to the amount of processing time/power utilized to accomplish the completed sub-task processing. The method 500 may further include collating the one or more status updates into a status notification, and transmitting the status notification to a client device for display to a client. These embodiments may be performed by, for example, the status module 128, the meter module 130, and/or the billing/reporting module 134.

The method 500 may continue by collating the one or more sub-tasks into a completed task (block 508). Block 508 may be performed by, for example, the job de-identifier 108. In certain embodiments, the method 500 may further include collating the one or more sub-tasks and the identifying information into the completed task. The method 500 may then continue by generating a completed task notification based upon the completed task (block 510). The completed task notification may be displayed to a client to report the completion of the task request, and to provide processing metric information related to the task request to the client.

For example, a completed task notification may display a completion notice (e.g., "Task request number ## is complete."), and may further display a processing breakdown of the task request with respect to the sub-tasks generated by the job de-identifier 108 and processed by either the private computing devices (e.g., private domain 122) or the public computing devices (e.g., public cloud 126). The completed task notification may then also display the cost to the client incurred based upon the processing completed by each computing node that participated in processing the task request (e.g., as shown in usage report interface 104c). Block 510 may be performed by, for example, the job de-identifier 108 and/or the request handler 106.

Other Matters

Although the preceding text sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more modules of a computer system (e.g., a processor or a group of processors) may be configured by software (e.g., an application or application portion) as a module that operates to perform certain operations as described herein.

In various embodiments, a module may be implemented mechanically or electronically. For example, a module may comprise dedicated circuitry or logic that is permanently configured (e.g., as a special-purpose processor, such as a field programmable gate array (FPGA) or an application-specific integrated circuit (ASIC) to perform certain operations. A module may also comprise programmable logic or circuitry (e.g., as encompassed within a general-purpose processor or other programmable processor) that is temporarily configured by software to perform certain operations. It will be appreciated that the decision to implement a module mechanically, in dedicated and permanently configured circuitry, or in temporarily configured circuitry (e.g., configured by software) may be driven by cost and time considerations.

Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules are temporarily configured (e.g., programmed), each of the modules need not be configured or instantiated at any one instance in time. For example, where the modules comprise a general-purpose processor configured using software, the general-purpose processor may be configured as respective different modules at different times. Software may accordingly configure a processor, for example, to constitute a particular module at one instance of time and to constitute a different module at a different instance of time.

Modules can provide information to, and receive information from, other modules. Accordingly, the described modules may be regarded as being communicatively coupled. Where multiple such modules exist contemporaneously, communications may be achieved through signal transmission (e.g., over appropriate circuits and buses) that connect the modules. In some embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the one or more processors or processor-implemented modules may be located in a single geographic location (e.g., at a location of a mobile computing device or at a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information. Such memories may be or may include non-transitory, tangible computer-readable media configured to store computer-readable instructions that may be executed by one or more processors of one or more computer systems.

As used herein any reference to "one embodiment" or "an embodiment" means that a particular element, feature, structure, or characteristic described in connection with the embodiment is included in at least one embodiment. The appearances of the phrases "in one embodiment," "in an embodiment," "in some embodiments," or similar phrases in various places in the specification are not necessarily all referring to the same embodiment or the same set of embodiments.

Some embodiments may be described using the terms "coupled," "connected," "communicatively connected," or "communicatively coupled," along with their derivatives. These terms may refer to a direct physical connection or to an indirect (physical or communicative) connection. For example, some embodiments may be described using the term "coupled" to indicate that two or more elements are in direct physical or electrical contact. The term "coupled," however, may also mean that two or more elements are not in direct contact with each other, but yet still co-operate or interact with each other. Unless expressly stated or required by the context of their use, the embodiments are not limited to direct connection.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless the context clearly indicates otherwise.

This detailed description is to be construed as exemplary only and does not describe every possible embodiment, as describing every possible embodiment would be impractical, if not impossible. One could implement numerous alternate embodiments, using either current technology or technology developed after the filing date of this application.

Upon reading this disclosure, those of skill in the art will appreciate still additional alternative structural and functional designs for the systems and a methods disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

Finally, the patent claims at the end of this patent application are not intended to be construed under 35 U.S.C. § 112(f), unless traditional means-plus-function language is expressly recited, such as "means for" or "step for" language being explicitly recited in the claims. The systems and methods described herein are directed to an improvement to computer functionality, which may include improving the functioning of conventional computers in performing tasks.

What is claimed is:

1. A system for leveraging inactive computing resources, comprising:
    one or more computing nodes having an active state and an inactive state, wherein the inactive state indicates a computing node of the one or more computing nodes is deactivated;
    one or more processors; and
    a memory communicatively coupled to the one or more computing nodes and the one or more processors, the memory containing instructions therein that, when executed, cause the one or more processors to:
        identify a task to be performed by the one or more computing nodes based upon a received request,
        receive a set of node identifications including a node identification from each node of the one or more computing nodes,
        schedule one or more sub-tasks associated with the task for execution on at least one computing node of the one or more computing nodes during the inactive state of the at least one computing node by applying a resource model to the set of node identifications,
        collate the one or more sub-tasks into a completed task, and
        generate a completed task notification based upon the completed task.

2. The system of claim 1, wherein the one or more computing nodes include a first set of computing nodes and a second set of computing nodes, each computing node in the first set of computing nodes is a private computing node, and wherein each computing node in the second set of computing nodes is a public cloud-based computing node.

3. The system of claim 2, wherein the active state of the private computing node indicates a private user utilizing the private computing node, and wherein the inactive state of the private computing node indicates a private user not utilizing the private computing node.

4. The system of claim 2, wherein the instructions, when executed, further cause the one or more processors to:
    determine a resource requirement for the one or more sub-tasks based upon a resource model; and
    route a task request including the resource requirement to each of the first set of computing nodes.

5. The system of claim 4, wherein the resource model is a machine learning model, and wherein the instructions, when executed, further cause the one or more processors to train the machine learning model with (i) a set of prior task data, (ii) a set of prior node identifications, and (iii) a set of prior completed task data.

6. The system of claim 1, wherein the instructions, when executed, further cause the one or more processors to:
    remove identifying information from the received request;

store at least a portion of the identifying information on a public storage device; and collate the one or more sub-tasks and the identifying information into the completed task.

7. The system of claim 1, wherein the instructions, when executed, further cause the one or more processors to:

during execution of the one or more sub-tasks, periodically request one or more status updates from the at least one computing node executing the one or more sub-tasks;

collate the one or more status updates into a status notification; and transmit the status notification to a client device for display to a client.

8. A computer-implemented method for leveraging inactive computing resources, comprising:

identifying a task to be performed by one or more computing nodes based upon a received request, wherein each of the one or more computing nodes has an active state and an inactive state, and wherein the inactive state indicates a computing node of the one or more computing nodes is deactivated;

receiving a set of node identifications including a node identification from each node of the one or more computing nodes;

scheduling one or more sub-tasks associated with the task for execution on at least one computing node of the one or more computing nodes during the inactive state of the at least one computing node by applying a resource model to the set of node identifications;

collating the one or more sub-tasks into a completed task; and generating a completed task notification based upon the completed task.

9. The computer-implemented method of the computer-implemented method of wherein the one or more computing nodes include a first set of computing nodes and second set of computing nodes, each computing node in the first set of computing nodes is a private computing node, and wherein each computing node in the second set of computing nodes is a public cloud-based computing node.

10. The computer-implemented method of claim 9, wherein the active state of the private computing node indicates a private user utilizing the private computing node, and wherein the inactive state of the private computing node indicates a private user not utilizing the private computing node.

11. The computer-implemented method of claim 9, further comprising:

determining a resource requirement for the one or more sub-tasks based upon a resource model; and routing a task request including the resource requirement to each of the first set of computing nodes.

12. The computer-implemented method of claim 11, wherein the resource model is a machine learning model, and the method further comprises training the machine learning model with (i) a set of prior task data, (ii) a set of prior node identifications, and (iii) a set of prior completed task data.

13. The computer-implemented method of claim 8, further comprising:

removing identifying information from the received request;

storing at least a portion of the identifying information on a public storage device; and collating the one or more sub-tasks and the identifying information into the completed task.

14. The computer-implemented method of claim 8, further comprising:

during execution of the one or more sub-tasks, periodically requesting one or more status updates from the at least one computing node executing the one or more sub-tasks;

collating the one or more status updates into a status notification; and transmitting the status notification to a client device for display to a client.

15. A non-transitory computer-readable storage medium comprising non-transitory computer-readable instructions stored thereon for leveraging inactive computing resources, wherein the instructions when executed on one or more processors cause the one or more processors to:

identify a task to be performed by one or more computing nodes based upon a received request, wherein each of the one or more computing nodes has an active state and an inactive state, and wherein the inactive state indicates a computing node of the one or more computing nodes is deactivated;

receive a set of node identifications including a node identification from each node of the one or more computing nodes;

schedule one or more sub-tasks associated with the task for execution on at least one computing node of the one or more computing nodes during the inactive state of the at least one computing node by applying a resource model to the set of node identifications;

collate the one or more sub-tasks into a completed task; and generate a completed task notification based upon the completed task.

16. The non-transitory computer-readable storage medium of claim 15, wherein the one or more computing nodes includes a first set of computing nodes and a second set of computing nodes, each computing node in the first set of computing nodes is a private computing node, and wherein each computing node in the second set of computing nodes is a public cloud-based computing node.

17. The non-transitory computer-readable storage medium of claim 16, wherein the active state of the private computing node indicates a private user utilizing the private computing node, and wherein the inactive state of the private computing node indicates a private user not utilizing the private computing node.

18. The non-transitory computer-readable storage medium of claim 16, wherein the instructions, when executed, further cause the one or more processors to:

determine a resource requirement for the one or more sub-tasks based upon a resource model; and route a task request including the resource requirement to each of the first set of computing nodes.

19. The non-transitory computer-readable storage medium of claim 18, wherein the resource model is a machine learning model, and wherein the instructions, when executed, further cause the one or more processors to train the machine learning model with (i) a set of prior task data, (ii) a set of prior node identifications, and (iii) a set of prior completed task data.

20. The non-transitory computer-readable storage medium of claim 15, wherein the instructions, when executed, further cause the one or more processors to:

remove identifying information from the received request;

store at least a portion of the identifying information on a public storage device;

during execution of the one or more sub-tasks, periodically request one or more status updates from the at least one computing node executing the one or more sub-tasks;
collate the one or more status updates into a status notification;
transmit the status notification to a client device for display to a client; and
collate the one or more sub-tasks and the identifying information into the completed task.

* * * * *